United States Patent [19]
Pickburn

[11] 4,058,022
[45] Nov. 15, 1977

[54] MOBIUS DRIVE BELT FASTENER

[76] Inventor: A. Harry S. Pickburn, 4457 Chestnut Ridge Road, Tonawanda, N.Y. 14150

[21] Appl. No.: 650,361

[22] Filed: Jan. 19, 1976

[51] Int. Cl.² ............................ F16G 3/07; F16G 7/00
[52] U.S. Cl. ............... 74/231 MB; 74/231 J; 74/238; 24/31 B
[58] Field of Search ............... 74/231 MB, 231 J, 238

[56] References Cited

U.S. PATENT DOCUMENTS

| 2,038,469 | 4/1936 | Bannister | 74/238 X |
| 2,220,869 | 11/1940 | Wehner | 74/231 MB |
| 2,296,740 | 9/1942 | Reiling | 74/234 |
| 2,404,271 | 7/1946 | Brunner | 74/234 |
| 3,343,425 | 9/1976 | Terhune | 74/238 |
| 3,461,733 | 8/1969 | Peterson | 74/238 |
| 3,631,732 | 1/1972 | Kleban | 74/231 J |
| 3,648,407 | 3/1972 | Pressman | 74/231 MB X |
| 3,777,586 | 12/1973 | Stirton | 74/231 J |

FOREIGN PATENT DOCUMENTS

| 936,731 | 4/1956 | Germany | 74/231 MB |

Primary Examiner—Leonard H. Gerin

[57] ABSTRACT

A mobius drive belt and mobius drive belt fastener are disclosed in which a drive belt of a polygonal or curvelinear cross section is joined to itself at the butt ends to form a drive belt having one continuous driving or belt engaging surface. The drive belt is employed for transmitting power from at least one driving pulley to at least one driven pulley. The mobius drive belt fastener allows the butt ends of the belt to be rotated up to about 180° with respect to one another.

4 Claims, 8 Drawing Figures

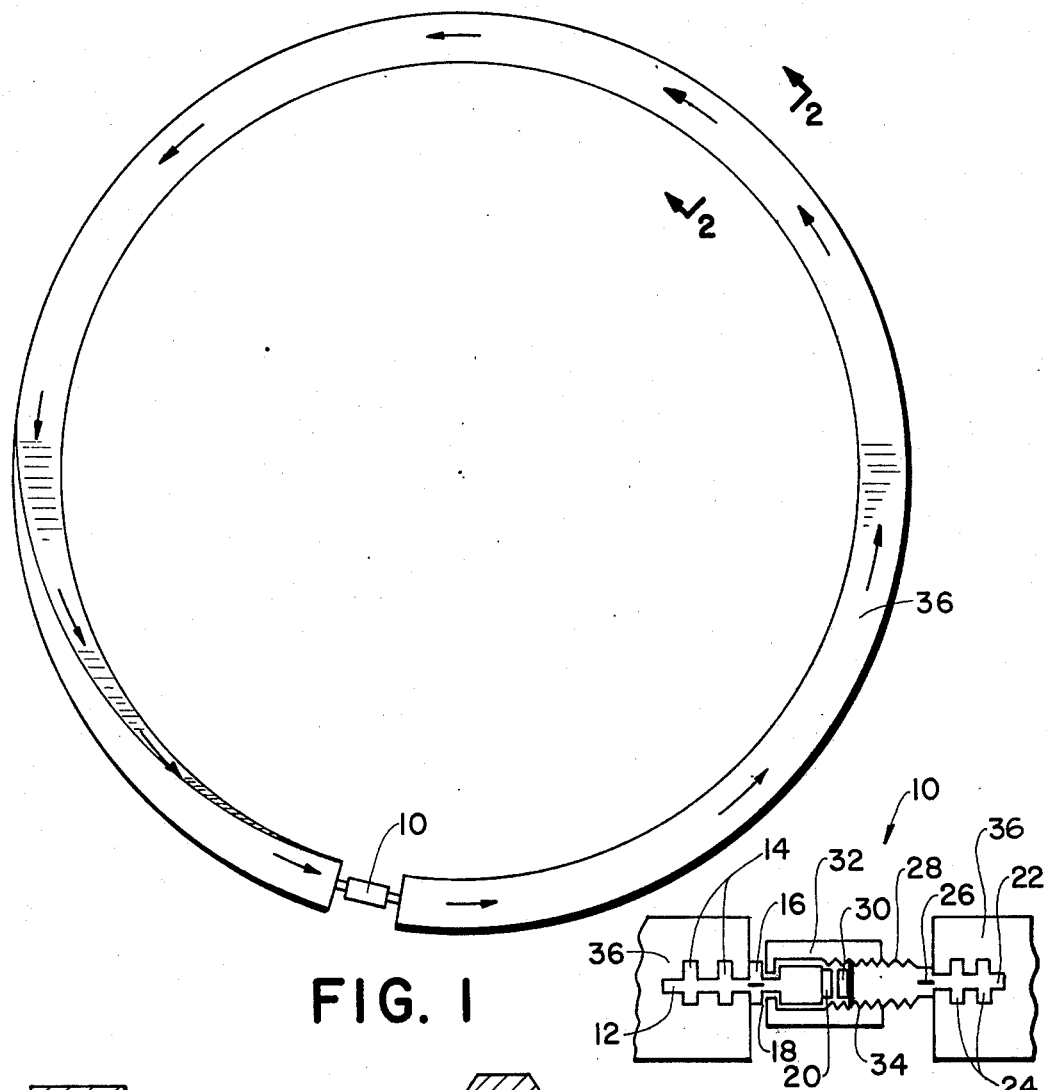
FIG. 1
FIG. 4
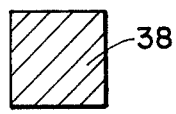
FIG. 2
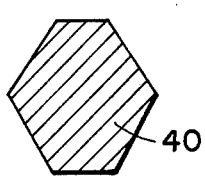
FIG. 3
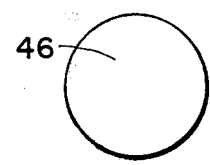
FIG. 7
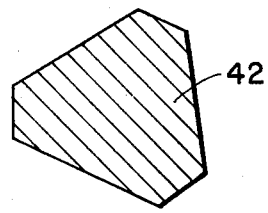
FIG. 5
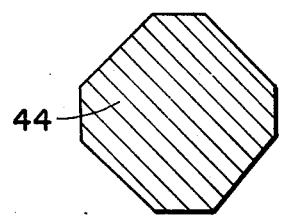
FIG. 6
FIG. 8

MOBIUS DRIVE BELT FASTENER

SUMMARY OF THE INVENTION

The present invention relates to a drive train comprising at least one belt driving pulley and at least one belt driven pulley and mobius loop drive belt means operatively connected to said pulleys, the mobius loop being formed by taking a flexible longitudinal belt member and butt joining the ends thereof so that one of said ends is rotated on its longitudinal axis up to about 180° with respect to the longitudinal axis passing through the other end.

In a further embodiment the belt has a cross section of any one of several geometrical shapes including a polygonal cross section, or a curvelinear cross section such as a circular cross section and an oval cross section.

In another embodiment a mobius drive belt fastener is provided having a first belt securing member, a second belt securing member, the securing members being joinable one to the other along a substantially common longitudinal axis, the securing members being lockably rotatable with respect to one another along the longitudinal axis. A coupling member is provided for joining the securing members to one another along the longitudinal axis whereby the securing members when attached to the butt ends of a drive belt can be lockably rotated about the longitudinal axis to form a mobius drive belt loop.

The securing members have locking surface members and locking surface engaging members for joining the securing members to one another, the locking surfaces comprising at least one friction pad member in one embodiment.

Any coupling means known in the art may be employed such as a collar rotatably lockable to one of the securing members and which screwingly engages the other of said securing members through screw thread means on the collar and screw thread receiving means on the securing member which does not rotatably receive the collar.

BRIEF DESCRIPTION OF THE SEVERAL VIEWS OF THE DRAWING

FIG. 1 is a plan view illustrating a mobius belt having a mobius drive belt fastener positioned thereon according to one embodiment of the present invention;

FIGS. 2, 3, 5, 6, 7 and 8 are geometrical cross sections of a mobius belt according to one embodiment of the present invention;

FIG. 4 is a side elevation in section of a mobius drive belt fastener according to one embodiment of the present invention.

DETAILED DESCRIPTION

A mobius drive belt for transmitting power from at least one pulley to at least a second driven pulley offers the advantage of having a continuous surface engaging both the driving pulley and the driven pulley members in a drive train. The mobius drive belt may consist of a flat two surface drive belt in which the belt is cut at one point, one end turned 180° and the belt then rejoined at the butt ends. In this way a belt that has by way of example a length of 60 inches with effectively two sides each of 60 inches will now still have a total length of 60 inches but one side of 120 inches in length.

For strength and longevity, drive belts are usually made from impregnated fibers, often cropped off a long tubular section. This method of production does not permit the application of the mobius strip principal. To individually mold each belt into the desired configuration would be prohibitive costwise.

Additionally, it would be an advantage in the art if wear can be distributed evenly to all of the surface area of a drive belt to thereby increase the useful life of the drive belt.

It is therefore an object of the present invention to overcome these and other difficulties encountered in the prior art.

It is a further object of the present invention to provide a drive belt and a drive train employing a belt having a one-sided surface to increase the useful life thereof.

It is a further object of the present invention to provide a method of adjustably joining and locking the butt ends of a drive belt to one another to form a mobius loop.

These and other objects have been achieved according to the present invention and will become apparent from the disclosure and claims that follow as well as the appended drawing.

According to the present invention, a mobius loop drive belt is used to transmit power from at least one driving pulley to at least one driven pulley.

A mobius drive belt fastener is also provided according to the present invention which is employed to join the two butt ends of a drive belt or to custom-make drive belts to any length from roll stock and at the same time affecting a rotation about the longitudinal axis of one butt end of the belt with respect to the other butt end of the belt of up to about 180°.

The principal advantage of the invention is that by effectively increasing the length of the continuous surface of the belt, the useful working life of the belt is also considerably increased resulting in less down time of machinery, automobiles and the like where a drive belt assembly is employed.

A drive belt having a round cross section can similarly be joined at the butt ends to form a mobius belt and if the butt ends are turned one degree off the longitudinal axis of the belt, an incredibly long surface may be obtained. Similarly, any polygonal cross-section belt may be joined at the butt ends to form a mobius loop, the greater the number of sides of the polygon, the greater the length of the one-sided surface thus formed.

The length of the surface may be increased by employing a belt of a polygonal cross section having many sides or by employing a belt of a cross section that is round and rotating the butt ends less than 180° along the longitudinal axis of the belt prior to securely joining one butt end to the other. The length of the one-sided surface is inversely proportional to the degree of rotation of the butt ends along the longitudinal axis of the drive belt; thus, one degree of rotation along this axis of a belt having a substantially round cross-sectional configuration would provide a drive belt having a longer one-sided surface than rotation of up to about 90° along this axis, where the length of the unjoined belt is the same in all instances.

A further major advantage of the invention is that even when the belt finally needs to be replaced, no costly tear-down of machinery is required. A requisite length of roll stock belting may be used, the fasteners applied to one end, the other end of the belt fed over the pulleys then fixed to the other side of the fastener.

Another advantage of the present invention is that a large inventory of drive belts need not be kept to maintain an adequate inventory or supply of drive belts for repair and reconstruction work. A modest amount of roll stock together with the mobius fasteners of the present invention will avoid the problem of having to have a variety of drive belts at hand.

Referring to the drawing and FIGS. 1 through 8, a mobius drive belt 36 is illustrated having a mobius drive belt fastener 10 securing the butt ends of drive belt 36 to one another, the butt ends being rotated 180° along the longitudinal axis of the belt 36.

FIG. 4 illustrates in greater detail the construction of the mobius belt fastener 10 and comprises a first securing member 12 having anchor pins 14 therein for firmly embedding the securing member 12 into one end of belt 36, a reference mark 16 being provided on securing member 12, a circumferential groove 18 extending around the outer surface of the securing member 12, securing member 12 terminating in a friction pad 20 comprising a rubber surface. A second securing member 22 having anchor pins 24 for embedding in the opposite butt end of belt 36 is illustrated, a reference mark 26 being provided on securing member 22 for alignment with or reference to indexing line 16. Screw threads 28 are provided in the outer surface of securing member 22, securing member 22 terminating in a friction receiving member such as friction pad 30 which may also be made of a rubber material. A rotatable collar 32 is provided for screwingly engaging threads 28 through screw threads 34 on the inner wall of collar 32.

Belt 36 may in addition to having a square cross-section as illustrated by belt cross-section 38 in FIG. 2 may also have a polygonal cross sectional configuration such as those configurations 40, 42, 44 illustrated in FIGS. 3, 5 and 6 or a curvelinear cross sectional configuration such as that illustrated by circle 46 and oval 48 in FIGS. 7 and 8 respectively.

In use, the securing members 12 and 22 are embedded in the butt ends of a drive belt such as drive belt 36, the anchors 14 and 24 holding securing members 12 and 22 firmly in place in the ends of belt 36. Securing members 12 and 22 are easily embedded in a rubber belt if the belt is made of uncured rubber and is soft enough to allow driving the securing members 12 and 24 into the ends thereof after which the belt may be cured around members 12 and 22 and the anchoring means 14 and 24. Collar 32 is then rotated in groove 18 and threads 28 engaged with threads 34 so that members 22 and 12 will be moved towards one another. Reference mark 26 is then aligned with respect to reference mark 16 or turned or rotated away from reference mark 16 until the butt ends of belt 36 are rotated about the longitudinal axis of the belt and the securing members 12 and 22 sufficiently to provide the length of the one-sided surface desired. By way of example, if the belt 36 has a cross section such as that illustrated in FIG. 2, i.e., cross section 38 comprising a square cross section rotation of the ends 90° with respect to one another about the longitudinal axis of the belt will increase the surface of the belt four-fold. If the cross-section of the belt is substantially the same as that as illustrated in FIG. 7 or is a circular cross-sectional configuration, rotation of the belt anywhere from about one degree up to about 180° will provide a continuous surface of a length inversely proportional to the angle the butt ends are rotated with respect to one another about the longitudinal axis of the belt.

Once the proper angle of rotation about the longitudinal axis is fixed by the alignment of reference marks 26 and 16, the collar 32 is rotated to bring friction surface 20 into contact with the friction receiving surface 30 which may be of the same rubber composition as surface 20. Once the collar 32 is sufficiently rotated so that the surfaces 20 and 30 firmly abutt one another, the butt ends of the belt 36 are firmly locked to one another whereby the ends are positioned on the longitudinal axis of the belt and with respect to one another so that a mobius drive loop is obtained.

Although the invention has been described by reference to some embodiments it is not intended that the novel belt be limited thereby but that some modifications are intended to be included as falling within the broad scope and spirit of the foregoing disclosure, the following claims and the appended drawing.

What is claimed is:

1. A mobius drive belt fastener means comprising a first belt securing means, and second belt securing means, said securing means being joinable one to the other along a substantially common longitudinal axis, said securing means being rotatable with respect to one another along said longitudinal axis, said first securing means has locking surface means extending therefrom, said second securing means has locking surface engaging means for lockably engaging said locking surface, when said securing means are coupled to one another, coupling means for joining said securing means to one another along said longitudinal axis whereby said securing means when attached to the butt ends of a drive belt can be lockably rotated along said axis to form a mobius belt drive loop.

2. The mobius drive belt fastener of claim 1 where said locking means comprise friction pad means.

3. The mobius drive belt fastener of claim 2 where said locking surface engaging means comprises friction pad means.

4. The mobius drive belt fastener of claim 3 where said coupling means comprises collar means rotatably securable to one of said securing means and which screwingly engages the other of said securing means through screw thread means on said collar and screw thread receiving means on the securing means which does not have said collar means rotatably secured thereto.

* * * * *